Feb. 19, 1935.   D. G. MACKENZIE   1,991,619
MOTOR CAR OR LIKE VEHICLE
Filed Aug. 25, 1930   3 Sheets-Sheet 1
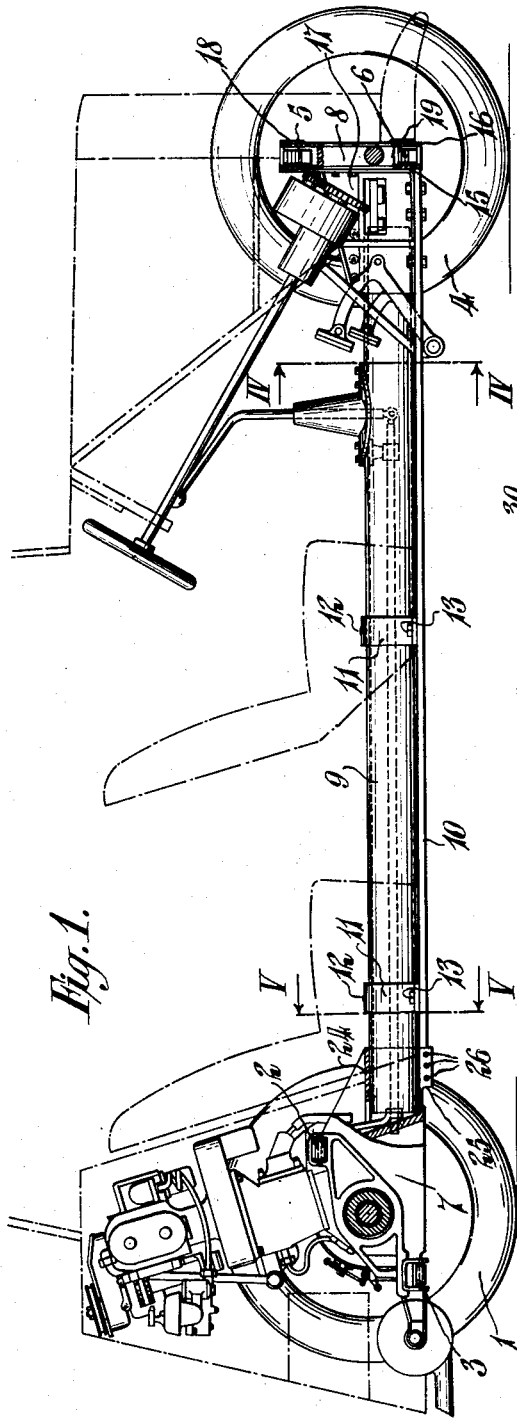
INVENTOR.
Donald Gordon Mackenzie
By E. J. Fetherstonhaugh
ATTORNEY Feb. 19, 1935.   D. G. MACKENZIE   1,991,619
MOTOR CAR OR LIKE VEHICLE
Filed Aug. 25, 1930   3 Sheets-Sheet 2
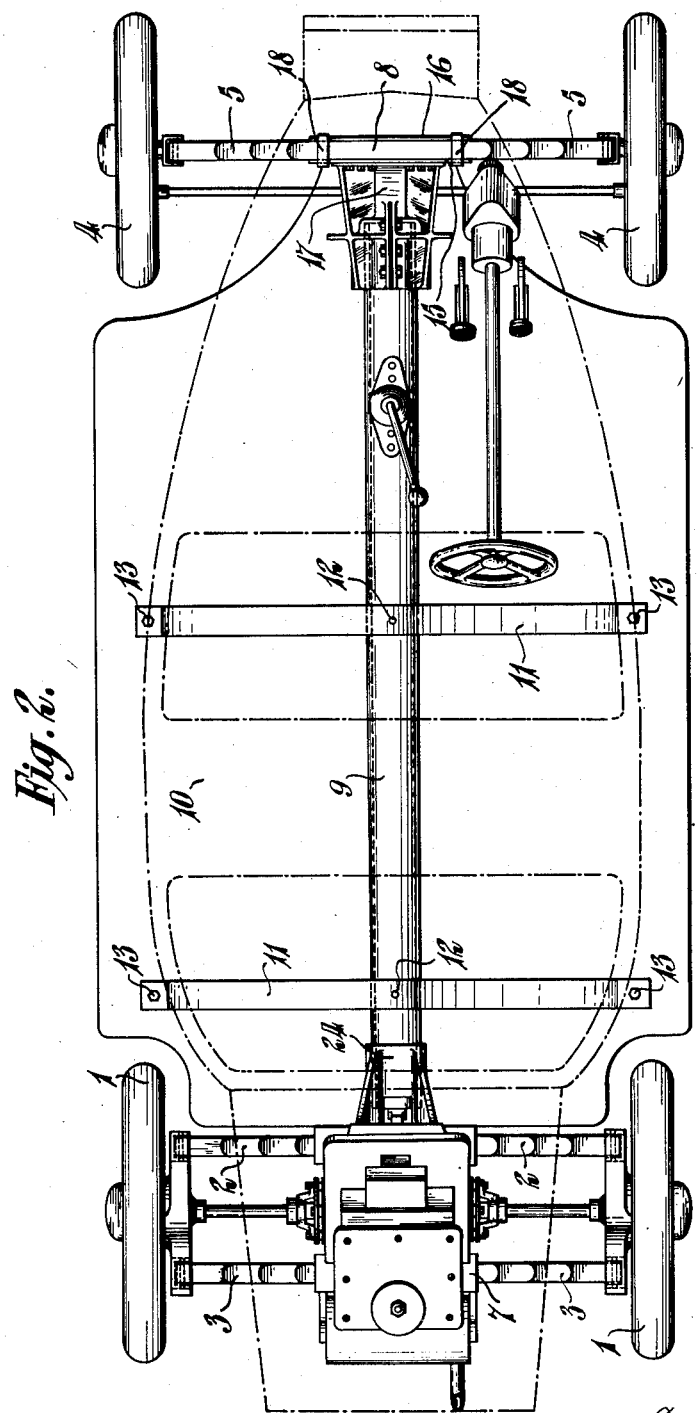
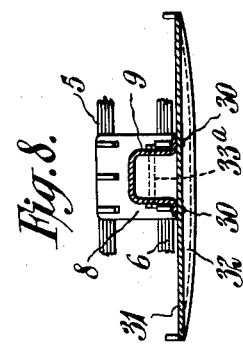
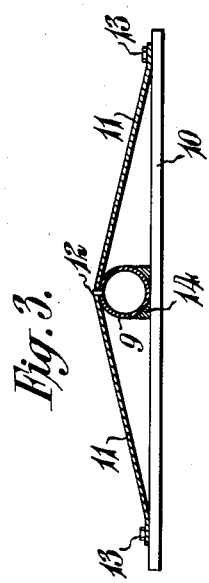

Feb. 19, 1935.  D. G. MACKENZIE  1,991,619
MOTOR CAR OR LIKE VEHICLE
Filed Aug. 25, 1930  3 Sheets-Sheet 3

INVENTOR
Donald Gordon Mackenzie
BY E. J. Fetherstonhaugh
ATTORNEY

Patented Feb. 19, 1935

1,991,619

UNITED STATES PATENT OFFICE 1,991,619

MOTOR CAR OR LIKE VEHICLE

Donald Gordon Mackenzie, Montreal, Quebec, Canada

Application August 25, 1930, Serial No. 477,506 In Great Britain February 10, 1930

2 Claims. (Cl. 280—124)

The present invention relates to improvements in or relating to chassis for motor cars or like vehicles and has for its object the provision of a chassis which will itself take up all strains or substantially take up all strains and so protect the bodywork of the car while at the same time being capable of being used for light cars.

According to the invention the chassis consists of a single central member extending longitudinally and secured at each end to leaf springs forming flexible axles for the wheels of the car.

In one form the central member may take the form of a tube while in an alternative construction it may be formed of pressed metal and have a three-sided rectangular section or a near equivalent to such section which may also have its fourth or underside secured to the pressed metal floor of the body to form an integral unit or it may, in fact, be part of the floor. Conveniently with a chassis such as is described the floor of the body of the vehicle may be supported below the central member so as to give a maximum height to the inside of the car. These and other features of the invention will be better understood by referring to the accompanying drawings which illustrate two alternative forms of carrying the invention into effect by way of example but it will be understood that considerable modifications may be made in the details of construction without departing from the spirit of the invention.

Fig. 1 shows a side elevation and Fig. 2 a plan view of one form of chassis of a motor car according to the present invention, while Fig. 3 shows a central section of the chassis indicating the way in which the body of the car can be supported.

Fig. 4 shows a half section of the chassis looking in the direction of the arrows IV—IV of Fig. 1 while

Figs. 6, 7 and 8 show an alternative construction of chassis with the floor of the body in position in plan, side elevation and sectional elevation respectively.

Figure 4:
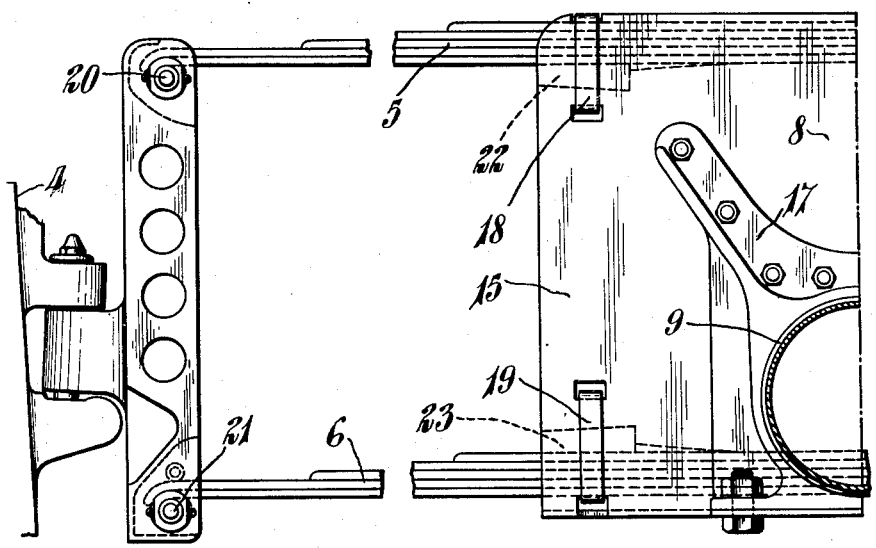

Referring to Figs. 1 and 2 which illustrate the principal feature of the invention, the rear wheels 1 are provided with flexible axles, consisting of leaf springs 2 and 3, the upper leaf spring 2 being in front of the lower leaf spring 3. Alternately, the reverse may be the case, i. e. the upper leaf spring may be behind the lower spring. The front wheels 4 are provided with a flexible axle consisting of leaf springs 5 and 6, the leaf spring 5 being vertically over the leaf spring 6. Secured directly to the leaf springs 2 and 3 in the driving unit and rear frame support, part of which is shown as transmission casing 7 which in the example illustrated carries the gearbox and the engine itself, although it will be understood that the invention which relates to the construction of chassis is in no way limited to any particular arrangement of the engine or other equipment. Secured to the leaf springs 5 and 6 is a central spring bracket 8. The front and rear axles are secured together by means of a single central member 9 which as shown in Figs. 1-5 takes the form of a tube, while in the arrangement shown in Figs. 6-8, it has a section in the form of a rectangle or square and is integral with the floor of the car body. It will be understood, however, that the invention is not limited to any particular section of the central member.

One advantage of a tubular section is that one end of the tube may be so secured to either the casing 7 of the central spring bracket 8 so as to permit of a rotary movement without permitting any end play, so enabling the wheels to be deflected relatively to each other without placing any strain on the bodywork of the car which is secured to the central tube. Preferably the rotary movement would be permitted at the front end of the tube.

One arrangement for securing the bodywork to the central tube is shown in Fig. 3, the floor 10 of the car is supported on the underside of the tube 9 by stays 11 consisting of strips or wires which are pinned to the tube at 12 and bolted to the floor at 13. Suitable cradles 14 would be secured to the floor 10 at intervals in which the tube 9 would rest as shown.

By employing a central tubular or like member as shown, any torque strains due to deflection of one wheel axle relatively to another are taken up directly independently of the body work which is thereby largely, if not wholly, protected from such strains and so avoids jambing of doors, windows and other parts due to this cause.

Furthermore, with the construction described, the floor of the car can be supported below the central shaft and so permit of more interior body space for a limited overall height of body.

The structure 8, it will be noted by reference to Figs. 1, 2 and 4, comprises a body portion consisting of two plates 15 and 16 between which the leaf springs 5 and 6 are secured and a bracket portion 17 having a tubular extension into which the tubular shaft 9 can fit. The tubular member can be secured in the bracket portion in a similar manner to that which will be described with reference to Fig. 5 or it can be secured so that it cannot move in a longitudinal direction but has freedom of movement in a rotary direction within certain prescribed limits. The bracket portion can be conveniently bolted to the plate 15 as shown in Figs. 1, 2 and 4, the plate 15 being bent to form a base to which the bracket portion can also be secured. Alternatively, a simple forging (Figs. 6 and 7) may be used in place of members 8 and 17.

Referring to Fig. 4 it will be noted that the springs 5 and 6 are secured to the plate by straps 18 and 19 respectively. These straps are located as near to the wheels as possible without unduly extending the width of the plates 15 and 16. The object of this is to reduce the distance between the shackle bolts 20 and 21 to which the leaf springs 5 and 6 are secured and the straps 18 and 29 and so reduce the amount of play and increase the horizontal stiffness normal to the spring axes between these two parts yet leaving the centre of the leaf spring free so that the advantages of a long spring may be combined with the torque resistance of a considerably shorter member. It will be understood that the other half of the section IV—IV of Fig. 1 is the exact counterpart of that shown in Fig. 4 so that there will be a strap similar to 18 and 19 at an equal distance on the other side of the centre line. Between the straps wedges of rubberized material 22 and 23 are provided so as to enable the leaf springs to be secured to the structure 8 in a manner which will not interfere with the deflection of the springs. The leaf springs are secured at their ends, as shown in Figs. 4 and 5, that is, the lower leaf spring has an eye at the end through which the shackle bolt passes and the second leaf spring passes partly round the eye of the first leaf spring and between a pin or like projecting member which prevents the second spring breaking away if the first spring should be broken so as to provide a reserve in such a contingency.

Figure 5:
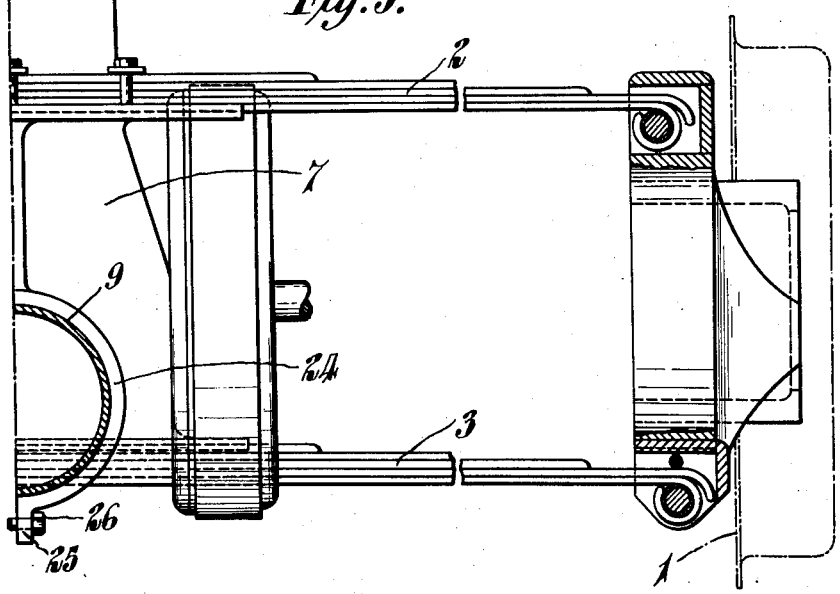
Fig. 5 shows a half section of the chassis looking in the direction of the arrows V—V of Fig. 1.

The arrangement for securing the tubular member 9 to the transmission casing 7 is illustrated in Figs. 1, 2 and 5, from which it will be noted that the transmission casing is provided with suitably positioned supports in which the springs 2 and 3 can be secured in their proper diagonal position, and is also provided with a suitable tubular extension bracket 24 by means of which the tube 9 can be secured. Referring to Fig. 5 it will be noted that the outer side of the tubular extension bracket 24 has a flange 25. The tubular portion of the extension bracket 24 is split at the lower end and is normally distended sufficiently to just admit one end of the tubular member 9. The bolts 26 pass through flanges 25 which are located on the two sides of the split collar of the bracket 24 and by clamping parts of said collar together by means of bolts 26, the tubular bracket may be made to grip the end of the member 9 and secure it against any movement. As it is essential that there should be no longitudinal movement, a dowel pin is provided (not shown) although generally the pin simply serves to ensure that the tube is positioned properly and is not subject to any considerable strains as these are taken up by the gripping force exerted by the split collar on the tube 9. It will be noted from Fig. 5 that the leaf springs 2 and 3 are of the same design as the leaf springs 5 and 6.

Referring to Figs. 6, 7 and 8 an alternative construction for the central portion is shown. The tube in this case is replaced by pressed metal members having sections as shown in Fig. 8. These sections, as in the previous construction, extend between the transmission casing 7 and the structure 8. Both the transmission casing 7 and the structure 8 are, however, constructed somewhat differently as the securing means is essentially different. The pressed member 9 is provided with two flanges 30 by means of which it can be bolted to the other pressed member 31 which forms together with the member 9 an integral frame and floor unit of great rigidity. The pressed metal floor is provided with lateral ribs 32 of section shown in Fig. 8. These ribs, conveniently located at positions which would cause them to lie under the seats of the car, are provided as additional means of support for the floor and body and may extend right across the floor width. At the front wheel end of the undercarriage the end portion of the member 9 is split at the top and provided with bolts 33a to form a clamp fitting over and clamping on to an extension 33 projecting from the front spring bracket 8. The floor 31 may have a portion 34 extending beneath the bracket 8 and arranged to form a horizontal flange serving to seat the spring bracket 8. As the remaining features are similar to those already described with reference to Figs. 1, 2 and 4, no further description is necessary for an understanding of the arrangement.

Referring to the rear wheel, the end portion of the member 9 is split at the top and provided with clamping bolts 35a, while the transmission casing 7 is provided with a suitable extension 35 adapted to fit into the end of member 9, and to be clamped therein. The casing 7 is also provided with a horizontal flange 36 to which an extension of the metal floor 31 may be bolted as shown in Fig. 7. In this case, in order to remove the motive unit and rear wheels of the car from the body portion, it will simply be necessary to undo the bolts securing 35 and 36 to the members 9 and 31 as will be readily understood.

In order that the car may be properly balanced it is arranged according to a further feature of the invention that the rear part of the car including engine gear-box and transmission casing are constructed of a light alloy, for instance, magnesium alloy, while the front part is constructed of the more usual metals such as aluminium alloy. By suitably proportioning the parts the centre of gravity of the car can be brought as far forward as in the standard designs having the engine in front.

I claim:

1. In a motor car, rear road wheels, leaf springs forming a flexible axle for said rear road wheels, means for securing said rear leaf springs together, said securing means being attached to said leaf springs at points to either side of the vertical, longitudinal plane passing through the centre of the car, a central frame member extending between and secured at its ends to said leaf spring-securing means, means for readily attaching and detaching said spring-securing means from the ends of said central member and front running gear including an axle structure secured to said frame member.

2. In a motor car, rear road wheels, leaf springs forming a flexible axle for said rear road wheels, a central frame member extending between and secured at its ends to said flexible axle, brackets secured to the ends of said leaf springs, shackle bolts in said brackets, a master leaf of each leaf spring passing round said shackle bolts, an additional spring leaf superimposed on each master leaf and passing partly round the shackle bolts on the outer side of the master leaf, means for preventing said additional leaf springs from becoming free if said master leaf springs should fracture and front running gear including an axle structure secured to said frame member.

DONALD GORDON MACKENZIE.